US005342435A

United States Patent [19]

Walls

[11] Patent Number: 5,342,435

[45] Date of Patent: Aug. 30, 1994

[54] SCRATCH REMOVER AND DESENSITIZER COMPOSITION FOR USE WITH LITHOGRAPHIC PRINTING PLATES

[75] Inventor: John E. Walls, Fort Collins, Colo.

[73] Assignee: Eastman Kodak Company, Rochester, N.Y.

[21] Appl. No.: 951,065

[22] Filed: Sep. 25, 1992

[51] Int. Cl.[5] .......... C09K 3/18

[52] U.S. Cl. .......... 106/2; 101/451; 101/459; 430/331

[58] Field of Search .......... 106/2; 101/451, 459; 430/331

[56] References Cited

U.S. PATENT DOCUMENTS

| | | | |
|---|---|---|---|
| 4,234,443 | 11/1980 | Canale et al. | 106/2 |
| 4,258,122 | 3/1981 | Uchida et al. | 430/253 |
| 4,340,509 | 6/1982 | Canale et al. | 106/2 |
| 4,399,243 | 8/1983 | Dixit et al. | 106/8 |
| 4,576,743 | 3/1986 | Kita et al. | 252/524 |
| 4,778,616 | 10/1988 | Gillich | 252/135 |
| 4,886,553 | 12/1989 | Gillich | 134/42 |
| 4,997,588 | 3/1991 | Gillich | 252/139 |

*Primary Examiner*—Helene Klemanski
*Attorney, Agent, or Firm*—Alfred P. Lorenzo

[57] ABSTRACT

A scratch remover and desensitizer composition which is especially useful in treating scratches in non-image areas of lithographic printing plates and desensitizing such scratched areas so they will not accept ink is comprised of an alkali metal silicate, a tribasic phosphate salt, an organic solvent, a nonionic surfactant and water.

10 Claims, No Drawings

SCRATCH REMOVER AND DESENSITIZER COMPOSITION FOR USE WITH LITHOGRAPHIC PRINTING PLATES

FIELD OF THE INVENTION

This invention relates in general to lithographic printing and in particular to a novel method and composition for treating lithographic printing plates having an aluminum support. More specifically, this invention relates to a scratch remover and desensitizer composition which is especially adapted for removing scratches from the non-image areas of lithographic printing plates and desensitizing such areas so they will not accept ink.

BACKGROUND OF THE INVENTION

The art of lithographic printing is based upon the immiscibility of oil and water, wherein the oily material or ink is preferentially retained by the image area and the water or fountain solution is preferentially retained by the non-image area. When a suitably prepared surface is moistened with water and an ink is then applied, the background or non-image area retains the water and repels the ink while the image area accepts the ink and repels the water. The ink on the image area is then transferred to the surface of a material upon which the image is to be reproduced, such as paper, cloth and the like. Commonly the ink is transferred to an intermediate material called the blanket, which in turn transfers the ink to the surface of the material upon which the image is to be reproduced.

In the offset printing art, printing plates are almost exclusively made with aluminum supports. Inherently, aluminum is a relatively soft metal so that it is frequently the case that the printing plate is subject to scratching or other damage in use.

Aluminum has been used for many years as a support for lithographic printing plates. In order to prepare the aluminum for such use, it is typical to subject it to both a graining process and a subsequent anodizing process. The graining process serves to improve the adhesion of the subsequently applied radiation-sensitive coating and to enhance the water-receptive characteristics of the background areas of the printing plate. The graining affects both the performance and the durability of the printing plate, and the quality of the graining is a critical factor determining the overall quality of the printing plate. A fine, uniform grain that is free of pits is essential to provide the highest quality performance.

Both mechanical and electrolytic graining processes are well known and widely used in the manufacture of lithographic printing plates. Optimum results are usually achieved through the use of electrolytic graining, which is also referred to in the art as electrochemical graining or electrochemical roughening, and there have been a great many different processes of electrolytic graining proposed for use in lithographic printing plate manufacturing. Processes of electrolytic graining are described, for example, in U.S. Pat. Nos. 3,755,116, 3,887,447, 3,935,080, 4,087,341, 4,201,836, 4,272,342, 4,294,672, 4,301,229, 4,396,468, 4,427,500, 4,468,295, 4,476,006, 4,482,434, 4,545,875, 4,548,683, 4,564,429, 4,581,996, 4,618,405, 4,735,696, 4,897,168 and 4,919,774.

Use of electrochemical graining requires the use of aluminum which is very pure and therefore very soft and this further aggravates the problem of scratch formation.

In the manufacture of lithographic printing plates, the graining process is typically followed by an anodizing process, utilizing an acid such as sulfuric or phosphoric acid, and the anodizing process is typically followed by a process which renders the surface hydrophilic such as a process of thermal silication or electrosilication. The anodization step serves to provide an anodic oxide layer and is preferably controlled to create a layer of at least 0.3 $g/m^2$. Processes for anodizing aluminum to form an anodic oxide coating and then hydrophilizing the anodized surface by techniques such as silication are very well known in the art, and need not be further described herein.

Included among the many patents relating to processes for anodization of lithographic printing plates are U.S. Pat. Nos. 2,594,289, 2,703,781, 3,227,639, 3,511,661, 3,804,731, 3,915,811, 3,988,217, 4,022,670, 4,115,211, 4,229,266 and 4,647,346. Illustrative of the many materials useful in forming hydrophilic barrier layers are polyvinyl phosphonic acid, polyacrylic acid, polyacrylamide, silicates, zirconates and titanates. Included among the many patents relating to hydrophilic barrier layers utilized in lithographic printing plates are U.S. Pat. Nos. 2,714,066, 3,181,461, 3,220,832, 3,265,504, 3,276,868, 3,549,365, 4,090,880, 4,153,461, 4,376,914, 4,383,987, 4,399,021, 4,427,765, 4,427,766, 4,448,647, 4,452,674, 4,458,005, 4,492,616, 4,578,156, 4,689,272, 4,935,332 and European Patent No. 190,643.

The anodization process is intended to make the surface more resistant to wear and to provide enhanced adhesion for the light-sensitive coatings that are applied thereto, but the oxide layer formed thereby is very thin and therefore easily subject to damage. Moreover, the hardness of the oxide layer is dependent on the particular characteristics of the anodization process utilized and the softer it is the more prone it is to damage from scratches.

Due to the environment in most print shops, it is unlikely that a printing plate can ever be robust enough to withstand the diverse conditions and methods of handling. Quite often, a plate is scratched before it gets to press. If the scratch is light and has not broken through the oxide layer, or has occurred on the image area, the print quality will not be affected. Many times, however, the oxide layer is seriously damaged and the area of damage will become ink receptive. Pressmen try various approaches to render these damaged areas hydrophilic, but typically such attempts are ineffective or short lived. Manufacturers of printing plates, as well as those producing ancillary chemicals for printers, commonly manufacture scratch remover compositions intended to restore hydrophilicity as an extended or permanent correction. Typically, these compositions are incapable of performing in a fully acceptable manner. The aim has been to formulate a composition that is easy to use and will effectively desensitize the damaged area under a variety of conditions so that a pressman will have a high likelihood of being able to use the plate in a normal manner and not have to replace it or experience excessive press stoppage for extensive corrective treatment. This has proven to be extremely difficult to achieve.

Many compositions have been proposed for use as scratch removers and desensitizers for lithographic printing plates and/or for such related functions as plate cleaners and plate finishers.

Examples include desensitizer compositions containing silicates, wetting agents and hydrophilic colloids as described in U.S. Pat. No. 4,258,122, issued Mar. 24, 1981; fountain solutions comprising trisodium phosphate, sodium metasilicate, tetrapotassium pyrophosphate, a nonionic surfactant and a dialkylpolysiloxane as described in U.S. Pat. No. 4,340,509, issued Jul. 20, 1982; scratch remover compositions comprising a water-in-oil emulsion as described in U.S. Pat. No. 4,399,243, issued Aug. 16, 1983; plate cleaning compositions comprising a silicate and a cationic or amphoteric surfactant as described in U.S. Pat. No. 4,576,743, issued Mar. 18, 1986; scratch remover compositions comprising trisodium phosphate, sodium metasilicate and an anionic surfactant as described in U.S. Pat. No. 4,778,616, issued Oct. 18, 1988, and plate cleaning compositions comprising an organic solvent, sodium metasilicate and a nonionic surfactant as described in U.S. Pat. Nos. 4,886,553, issued Dec. 12, 1989 and 4,997,588, issued Mar. 5, 1991.

It is toward the objective of providing a new and improved scratch remover and desensitizer composition that overcomes the disadvantages of prior art compositions, and more effectively meets the needs of the lithographic printing plate art, that the present invention is directed.

SUMMARY OF THE INVENTION

In accordance with this invention, a scratch remover and desensitizer composition for use with lithographic printing plates is comprised of:

(1) an alkali metal silicate having an $SiO_2$ to $M_2O$ ratio of at least two to one, wherein M represents an alkali metal, (2) a phosphate of the formula $M_3PO_4$ wherein M represents an alkali metal;

(3) an organic solvent, (4) a nonionic surfactant and (5) water.

The novel scratch remover and desensitizer composition of this invention is utilized in the method of this invention by applying it to a scratch in a non-image area of a lithographic printing plate having a grained and anodized aluminum support. Treatment of the scratch with the composition, for example, by application with a felt-tip pen, desensitizes the scratched area so that it will not accept ink.

The alkali metal silicate serves to form a permanent hydrophilic layer. Sodium silicates are preferred. Potassium and lithium silicates are also very effective but are less desirable because of their significantly higher cost. It is particularly important that the $SiO_2$ to $M_2O$ ratio be at least two to one in order to achieve permanent formation of a hydrophilic layer. A particularly preferred silicate for use in this invention is SILICATE D available from Philadelphia Quartz Corporation. It has an $SiO_2:Na_2O$ ratio of 2.5:1. Sodium meta silicate, which has the formula $Na_2SiO_3$ and an $SiO_2:Na_2O$ ratio of 1:1, is unsatisfactory for the purposes of this invention. It has the ability to dissolve aluminum and thereby prevent the permanent formation of a hydrophilic layer.

The phosphate which is utilized in the novel composition of this invention serves to activate the surface of the aluminum by providing a slight degree of etch. It is also able to phosphate the surface by reacting with aluminum to form an insoluble hydrophilic salt that remains as part of the surface. Use of trisodium phosphate is preferred. The corresponding potassium and lithium phosphates, i.e., tripotassium phosphate and trilithium phosphate, are also effective but are less desirable because of their significantly higher cost. Only the tribasic phosphate salts are useful for the purposes of this invention, as the mono-basic and di-basic phosphate salts are ineffective in the scratch remover and desensitizer composition described herein.

The organic solvent primarily assists in the removal of ink and other interfacial contaminants while the primary function of the nonionic surfactant is to reduce the surface tension, thereby facilitating better penetration of the active components into the grain structure without at the same time adversely affecting the background hydrophilicity or image oleophilicity.

The scratch remover and desensitizer composition of this invention has the ability to effectively restore a damaged portion of a lithographic printing plate that is printing in the background to a fully desensitized clean printing surface. The composition will effectively desensitize not only an area of the plate background that has been damaged by scratching but also background areas that are printing because of toning or scumming.

DESCRIPTION OF THE PREFERRED EMBODIMENTS

The term "aluminum" as used herein is intended, as the context requires, to include both pure aluminum and aluminum alloys. Suitable alloys of aluminum include alloys containing minor amounts of any of silicon, iron, copper, manganese, magnesium, zinc, titanium, chromium, nickel and the like.

The scratch remover and desensitizer composition of this invention is useful with a very wide range of lithographic printing plates. For example, it is useful with both negative-working and positive-working plates. Plates based on the use of radiation-sensitive photopolymers and plates based on the use of diazo resins can be usefully treated with the composition described herein.

As indicated hereinabove, the scratch remover and desensitizer composition of this invention is comprised of:

(1) an alkali metal silicate having an $SiO_2$ to $M_2O$ ratio of at least two to one, wherein M represents an alkali metal;

(2) a phosphate of the formula $M_3PO_4$ wherein M represents an alkali metal, (3) an organic solvent, (4) a nonionic surfactant, and (5) water.

The alkali metal silicate is typically present in the composition in an amount of from about 0.5 to about 15 weight percent and preferably in an amount of from about 2 to about 8 weight percent; the tribasic phosphate salt is typically present in the composition in an amount of from about 0.1 to about 12 weight percent and preferably in an amount of from about 1 to about 4 weight percent; the organic solvent is typically present in the composition in an amount of from about 1 to about 40 weight percent and preferably in an amount of from about 5 to about 15 weight percent; the nonionic surfactant is typically present in the composition in an amount of from about 0.01 to about 4 weight percent and preferably in an amount of from about 0.3 to about 1 weight percent; and water is typically present in the composition in an amount of from about 30 to about 98 weight percent and preferably in an amount of from about 75 to about 90 weight percent.

In using the composition of this invention, the alkali metal silicate and the tribasic phosphate salt interact to provide a robust, continuous and permanent hydrophilic layer that obviates the adverse effects of scratches, abrasion and other handling defects. The silicate/phosphate system is not able to activate and therefore ultimately passivate the aluminum surface unless ink and other oily dirt is removed. This is the primary function of the organic solvent. A very wide range of organic solvents are useful for this purpose. Preferred solvents are those that work at a low concentration, are low in toxicity, and evaporate slowly enough to be effective yet not so slowly as to remain on the plate. Preferably, the organic solvent is water-miscible.

Glycol ethers are preferred for use as the organic solvent in the scratch remover and desensitizer composition of this invention. Suitable glycol ethers for this purpose include:

ethylene glycol monomethyl ether
ethylene glycol monoethyl ether
ethylene glycol monomethyl ether acetate
diethylene glycol monomethyl ether
ethylene glycol monoethyl ether acetate
ethylene glycol dimethyl ether
ethylene glycol monobutyl ether
diethylene glycol monobutyl ether acetate
diethylene glycol monobutyl ether
propylene glycol monomethyl ether
propylene glycol monoethyl ether
propylene glycol monomethyl ether acetate
dipropylene glycol monomethyl ether
and the like.

Examples of other useful organic solvents for the purpose of this invention include alcohols such as isopropanol, n-propanol, n-butanol, and tetrahydrofurfuryl alcohol; organic esters such as ethylhexyl acetate, isopropyl acetate, n-butyl propionate and ethyl propionate; ketones such as methyl propyl ketone, methyl isobutyl ketone, diacetone alcohol and isophorone; ethers such as isopropyl ether; glycols such as ethylene glycol, propylene glycol, dipropylene glycol and triethylene glycol.

It is particularly preferred in the composition of this invention to utilize an organic solvent having a boiling point at atmospheric pressure in the range of from 95° C. to 210° C.

Nonionic surfactants utilized in this invention preferably have a hydrophile-lipophile balance (HLB) of greater than 12 and more preferably of at least 16. The hydrophile-lipophile balance is widely used to characterize surfactants based upon their relative balance of hydrophilic and oleophilic groups. For a description of hydrophile-lipophile balance see "Emulsions", *Kirk-Othmer Encyclopedia of Chemical Technology*, 3rd Ed., Vol. 8, pp. 900–930, Wiley-Interscience, New York, N.Y., (1978). The higher the HLB value the greater the degree of hydrophilicity.

An alkylphenoxy polyoxyalkylene ethanol is especially useful as the nonionic surfactant in the scratch remover and desensitizer composition described herein.

A preferred nonionic surfactant for use in this invention is TRITON X-405 surfactant which is manufactured by Rohm and Haas. It is a 70% by weight aqueous solution of octylphenoxy polyoxyethylene ethanol with an HLB of 17.9. The isooctyl, nonyl, decyl, undecyl, dodecyl and tridecyl analogs are also useful in this invention as well as the oxypropylene derivatives.

Examples of other classes of nonionic surfactants that are useful for the purpose of this invention include ethoxylated and propoxylated alcohols including but not limited to decanol, octanol, tridecanol, cetyl alcohol and stearyl alcohol; silicon glycol copolymers; fluorinated alkyl polyoxyethylene ethanols; and glycerol and glycol esters.

As indicated hereinabove, lithographic printing plates typically comprise an aluminum support. Such plates also include at least one radiation-sensitive layer overlying the support.

A wide variety of radiation-sensitive materials suitable for forming images for use in the lithographic printing process are known. Any radiation-sensitive layer is suitable which, after exposure and any necessary developing and/or fixing, provides an area in imagewise distribution which can be used for printing.

Useful negative-working compositions include those containing diazo resins, photocrosslinkable polymers and photopolymerizable compositions. Useful positive-working compositions include aromatic diazooxide compounds such as benzoquinone diazides and naphthoquinone diazides.

Radiation-sensitive materials useful in lithographic printing plates include silver halide emulsions, quinone diazides (polymeric and non-polymeric), as described in U.S. Pat. No. 4,141,733 (issued Feb. 27, 1979 to Guild) and references noted therein; light sensitive polycarbonates, as described in U.S. Pat. No. 3,511,611 (issued May 12, 1970 to Rauner et al) and references noted therein; diazonium salts, diazo resins, cinnamal-malonic acids and functional equivalents thereof and others described in U.S. Pat. No. 3,342,601 (issued Sep. 19, 1967 to Houle et al) and references noted therein; and light sensitive polyesters, polycarbonates and polysulfonates as described in U.S. Pat. No. 4,139,390 (issued Feb. 13, 1979 to Rauner et al) and references noted therein.

A particularly important class of negative-working lithographic printing plates are those based on the use of diazo resins. The radiation-sensitive layer is typically comprised of the diazo resin, a polymeric binder and other ingredients such as colorants, stabilizers, exposure indicators, surfactants and the like. Particularly useful diazo resins include, for example, the condensation product of p-diazo diphenyl amine and paraformaldehyde, the condensation product of 3-methoxy-4-diazo diphenylamine and paraformaldehyde, and the diazo resins of U.S. Pat. Nos. 3,679,419, 3,849,392 and 3,867,147. Particularly useful polymeric binders for use with such diazo resins are acetal polymers as described, for example, in U.S. Pat. Nos. 4,652,604, 4,741,985 and 4,940,646.

A second particularly important class of negative-working lithographic printing plates are those based on the use of radiation-sensitive photocrosslinkable polymers. Photocrosslinkable polymers which are particularly useful for this purpose are those containing the photosensitive group —CH═CH—CO— as an integral part of the polymer backbone, especially the p-phenylene diacrylate polyesters. These polymers are described, for example, in U.S. Pat. Nos. 3,030,208, 3,622,320, 3,702,765 and 3,929,489. A typical example of such a photocrosslinkable polymer is the polyester prepared from diethyl p-phenylenediacrylate and 1,4-bis(β-hydroxyethoxy)cyclohexane, which is comprised of recurring units of the formula:

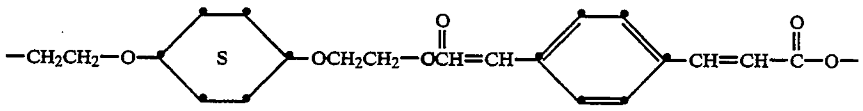

Other particularly useful polymers of this type are those which incorporate ionic moieties derived from monomers such as dimethyl-3,3'-[(sodioimino)disulfonyl]-dibenzoate and dimethyl-5-sodiosulfoisophthalate. Examples of such polymers include poly[1,4-cyclohexylene-bis(oxyethylene)-p-phenylenediacrylate]-co3,3'-[sodioimino)disulfonyl]dibenzoate and poly[1,4-cyclohexylene-bis(oxyethylene)-p-phenylenediacrylate]-co-3,3'-[sodioimino)disulfonyl]dibenzoate-co-3-hydroxyisophthalate.

A third particularly important class of negative-working lithographic printing plates are the so-called "dual layer" plates. In this type of lithographic printing plate, a radiation-sensitive layer containing a diazo resin is coated over an anodized aluminum support and a radiation-sensitive layer containing a photocrosslinkable polymer is coated over the layer containing the diazo resin. Such dual layer plates are described, for example, in British Patent No. 1 274 017. They are advantageous in that radiation-sensitive layers containing diazo resins adhere much more strongly to most anodized aluminum supports than do radiation-sensitive layers containing photocrosslinkable polymers. Thus, the enhanced performance provided by photocrosslinkable polymers is achieved without sacrificing the excellent adhesive properties of diazo resin compositions.

The invention is further illustrated by the following examples of its practice.

Example 1

A scratch remover and desensitizer composition useful for treating lithographic printing plates was prepared in accordance with the following formulation:

| Ingredient | Weight % |
|---|---|
| SILICATE D | 4.0 |
| Trisodum phosphate (anhydrous) | 2.0 |
| Propylene glycol monomethyl ether | 10.0 |
| TRITON X-405 surfactant | 0.5 |
| Water | 83.5 |
| | 100.0 |

The composition described above is a clear, water-white solution having a pH of 12.4 and a density of 1.0338. It was used in treating scratches on the lithographic printing plate described in U.S. Pat. No. 4,647,346, issued Mar. 3, 1987.

The plate was intentionally scratched by using a stiff wire bristle brush after the plate was exposed, developed and finished. It was permitted to remain as such with no further treatment for four hours prior to being run on press. Upon being placed on press, the plate was rolled up in the standard manner. The 100th pull sheet was taken for observation. It was seen that the area abraded with the wire brush was printing. Using the composition described above, the plate surface was treated in half the scratched area. The plate was rolled up and a pull sheet was taken after 100 impressions. It was observed that the untreated scratched area was still printing with the same degree of severity. The area treated with the scratch remover and desensitizer composition printed clean with no trace of background sensitivity. The run continued to 220,000 impressions at which point the plate was pulled due to image wear. This completed the run. The untreated scratched area still continued to print and was considered essentially the same as at the beginning of the job. The treated area remained clean with no loss of hydrophilicity.

For purposes of comparison, the same lithographic printing plate was treated in the same manner with the following compositions with results as described hereinbelow.

Comparative Example 1

A composition otherwise identical to that described in Example 1 was prepared except that the SILICATE D was omitted.

In like manner as described in Example 1, the plate was scratched and run on press where it was observed that the pull sheet at 100 impressions was clean in the scratched area treated with the composition of this example. The run proceeded with pull sheets being taken every 10,000 impressions. At 60,000 impressions it was noticed that the treated area began to show sensitivity in some of the scratched areas. This became progressively more severe until 90,000 impressions where it was concluded the scratches were as pronounced as the scratches on the section of the plate not treated with the composition of this example.

Comparative Example 2

A composition otherwise identical to that described in Example 1 was prepared except that the trisodium phosphate was omitted.

In like manner as described in Example 1, the plate was scratched and run on press where it was observed that the pull sheet at 100 impressions was clean in the scratched area treated with the composition of this example. The run proceeded with pull sheets being taken every 10,000 impressions. At 20,000 impressions it was observed that the treated area began to show sensitivity in all the scratches although the density was not as great as the scratches in the untreated area. At 30,000 impressions the scratches in the treated area were equal to those in the untreated area.

Comparative Example 3

A composition otherwise identical to that described in Example 1 was prepared except that the SILICATE D was replaced with an equal weight of sodium metasilicate.

In like manner as described in Example 1, the plate was scratched and run on press where it was observed that the pull sheet at 100 impressions was clean in the scratched area treated with the composition of this example. The run proceeded with pull sheets being taken every 10,000 impressions. At 70,000 impressions it was observed that the treated area began to show sensitivity in some of the scratched areas. The appearance of the scratches became progressively worse until 90,000 impressions where the scratches in the treated section were equal to those in the untreated area.

Comparative Example 4

A composition otherwise identical to that described in Example 1 was prepared except that the trisodium phosphate was replaced with an equal weight of disodium phosphate.

In like manner as described in Example 1, the plate was scratched and run on press where it was observed that the pull sheet at 100 impressions displayed very slight sensitivity in the area treated with the composition of this example. The run proceeded with pull sheets being taken every 10,000 impressions. At 40,000 impressions the scratches in the treated area were equal to those in the untreated area.

Comparative Example 5

A composition otherwise identical to that described in Example 1 was prepared except that the propylene glycol monomethyl ether was omitted.

In like manner as described in Example 1, the plate was scratched and run on press where it was observed that the pull sheet at 100 impressions exhibited a treated area that was only slightly better than the non-treated area. At 5,000 impressions both sections were equal. Upon closer inspection it was seen that the ink was not removed during the application of the scratch remover and desensitizer composition.

Comparative Example 6

A composition sold by PRINTING DEVELOPMENTS, INC. under the name Plate Cleaner and Scratch Remover was analyzed and found to be an aqueous solution containing 0.43 percent by weight sodium metasilicate, 0.8 percent by weight trisodium phosphate, 8.4 percent by weight ethylene glycol monobutyl ether and, as a nonionic surfactant, a polyoxyethylene lauryl ether with an HLB of 9.9.

In like manner as described in Example 1, the plate was scratched and run on press where it was observed that the pull sheet at 100 impressions was clean in the scratched area treated with the composition of this example. The run proceeded with pull sheets being taken every 10,000 impressions. At 70,000 impressions it was observed that the plate began to show sensitivity in the scratched area which had been treated. The appearance of the scratches became progressively worse until 100,000 impressions where the scratches in the treated section were equal to those in the untreated section.

As indicated by the above examples, effective results were obtained in using the scratch remover and desensitizing composition only when it contained all of the essential ingredients as described herein.

The invention has been described in detail, with particular reference to certain preferred embodiments thereof, but it should be understood that variations and modifications can be effected within the spirit and scope of the invention.

I claim:

1. A scratch remover and desensitizer composition useful in treating scratches in non-image areas of lithographic printing plates and desensitizing such scratched areas so they will not accept ink, said composition comprising:

(1) about 0.5 to about 15 weight percent of an alkali metal silicate having an $SiO_2$ to $M_2O$ ratio of at least two to one, wherein M represents an alkali metal;

(2) about 0.1 to about 12 weight percent of a phosphate of the formula $M_3PO_4$ wherein M represents an alkali metal;

(3) about 1 to about 40 weight percent of an organic solvent having a boiling point at atmospheric pressure in the range of from 95° C. to 210° C.;

(4) about 0.01 to about 4 weight percent of a nonionic surfactant; and (5) about 30 to about 98 weight percent of water.

2. A composition as claimed in claim 1 comprising about 2 to about 8 weight percent of said alkali metal silicate, about 1 to about 4 weight percent of said phosphate, about 5 to about 15 weight percent of said organic solvent, about 0.3 to about 1 weight percent of said nonionic surfactant; and about 75 to about 90 weight percent of water.

3. A composition as claimed in claim 1 wherein said alkali metal silicate is a sodium silicate.

4. A composition as claimed in claim 1 wherein said phosphate is trisodium phosphate.

5. A composition as claimed in claim 1 wherein said organic solvent is a glycol ether.

6. A composition as claimed in claim 1 wherein said organic solvent is propylene glycol monomethyl ether.

7. A composition as claimed in claim 1 wherein said nonionic surfactant has a hydrophilelipophile balance of at least 16.

8. A composition as claimed in claim 1 wherein said nonionic surfactant is an alkylphenoxy polyoxyalkylene ethanol.

9. A composition as claimed in claim 1 wherein said nonionic surfactant is an octylphenoxy polyoxyethylene ethanol.

10. A scratch remover and desensitizer composition useful in treating scratches in non-image areas of lithographic printing plates and desensitizing such scratched areas so they will not accept ink; said composition comprising:

(1) about 4 weight percent of a sodium silicate having an $SiO_2$:$M_2O$ ratio of about 2.5:1;

(2) about 2 weight percent of trisodium phosphate;

(3) about 10 weight percent of propylene glycol monomethyl ether;

(4) about 0.5 weight percent of an octylphenoxy polyoxyethylene ethanol with a hydrophilelipophile balance of about 18; and (5) about 84 weight percent of water.

* * * * *